US007326379B2

(12) United States Patent
Hasegawa et al.

(10) Patent No.: US 7,326,379 B2
(45) Date of Patent: Feb. 5, 2008

(54) APPARATUS AND METHOD FOR PRODUCING SOAP CAKE

(75) Inventors: Takeshi Hasegawa, Tokyo (JP); Koichi Hatano, Tochigi (JP); Yasunori Miyamoto, Tochigi (JP); Tadao Abe, Tokyo (JP); Manabu Shibata, Tochigi (JP)

(73) Assignee: Kao Corporation, Tokyo (JP)

( * ) Notice: Subject to any disclaimer, the term of this patent is extended or adjusted under 35 U.S.C. 154(b) by 306 days.

(21) Appl. No.: 10/391,628

(22) Filed: Mar. 20, 2003

(65) Prior Publication Data

US 2003/0180411 A1 Sep. 25, 2003

(30) Foreign Application Priority Data

Mar. 22, 2002 (JP) ............................ 2002-082024
Mar. 22, 2002 (JP) ............................ 2002-082025

(51) Int. Cl.
*B29C 45/00* (2006.01)
*C11D 13/16* (2006.01)

(52) U.S. Cl. .................... 264/328.1; 425/564; 425/571

(58) Field of Classification Search ............ 264/328.1; 425/564, 571, 557; 510/447
See application file for complete search history.

(56) References Cited

U.S. PATENT DOCUMENTS

| | | | | |
|---|---|---|---|---|
| 33,055 | A | 8/1861 | Smith | |
| 174,365 | A | 3/1876 | Jackson et al. | |
| 1,244,297 | A * | 10/1917 | Curland | 425/446 |
| 1,912,637 | A | 6/1933 | Harper | |
| 2,398,776 | A * | 4/1946 | Bodman | 510/440 |
| 2,878,515 | A * | 3/1959 | Strauss | 425/547 |
| 2,975,485 | A | 3/1961 | Wendt | |
| 2,987,484 | A | 6/1961 | Lundberg et al. | |
| 3,535,742 | A * | 10/1970 | Paul | 425/146 |
| 3,820,928 | A * | 6/1974 | Lemelson | 425/146 |
| 3,847,526 | A * | 11/1974 | Fries | 425/562 |
| 4,545,952 | A * | 10/1985 | Laghi | 264/328.2 |
| 5,961,898 | A * | 10/1999 | Higashida et al. | 264/39 |
| 6,027,328 | A * | 2/2000 | Herbst | 425/553 |
| 6,224,812 | B1 * | 5/2001 | Allan et al. | 264/328.1 |
| 6,238,612 | B1 * | 5/2001 | Allan et al. | 264/325 |
| 6,440,349 | B1 * | 8/2002 | Johnson | 264/325 |
| 6,800,601 | B2 * | 10/2004 | Allan et al. | 510/447 |
| 2003/0180411 | A1 | 9/2003 | Hasegawa et al. | |
| 2006/0094611 | A1 | 5/2006 | Shimada et al. | |

FOREIGN PATENT DOCUMENTS

| | | |
|---|---|---|
| JP | 4-71813 | 3/1992 |
| JP | 4-78508 | 3/1992 |
| JP | 10-195495 | 7/1998 |

(Continued)

*Primary Examiner*—Jill L. Heitbrink
(74) *Attorney, Agent, or Firm*—Oblon, Spivak, McClelland, Maier & Neustadt, P.C.

(57) ABSTRACT

An apparatus for producing a soap cake comprising a mold which has a cavity of prescribed shape, a feed passage for feeding molten soap to the cavity, and means for pushing molten soap remaining in the feed passage at the time of feeding molten soap to the cavity to remove molten soap remaining in the feed passage. One end of the feed passage is a gate, in which a gate pin for shutting the connection between a feed port and the cavity is slidably provided. As the gate pin advances, molten soap remaining in the feed passage is removed in the step of feeding molten soap to the cavity.

14 Claims, 11 Drawing Sheets

FOREIGN PATENT DOCUMENTS

| | | |
|---|---|---|
| JP | 11-10677 | 1/1999 |
| JP | 2000-190365 | 7/2000 |
| JP | 2001-525881 | 12/2001 |
| JP | 2002-9096 | 1/2002 |
| WO | WO98/53039 | 11/1998 |
| WO | WO 98/53039 | 11/1998 |

* cited by examiner

APPARATUS AND METHOD FOR PRODUCING SOAP CAKE

BACKGROUND OF THE INVENTION

The present invention relates to an apparatus for molding and solidifying molten soap into a prescribed shape to produce soap cakes and a mold to be used in the apparatus. It also relates to a method of producing soap cakes by molding and solidifying molten soap into a prescribed shape.

U.S. Pat. No. 2,987,484 discloses a process of making soap bars comprising injecting molten soap circulating in a circulating duct into the cavity of a mold and solidifying the molten soap in the cavity. The mold has an injection valve in the gate. With the injection valve in the backward position, molten soap is injected into the cavity through the gate. Because the injection valve is smaller in size than the gate, after the injection valve advances to shut the injection port of the cavity, molten soap remains in the gap formed between the injection valve and the gate. The remaining molten soap does not return to the circulating duct and gradually cools and solidifies there. Therefore, the remaining soap should be removed before the next shot, which results in poor productivity. If the soap is not removed, it can cause faults in the subsequent molding cycle and impede obtaining homogeneous products.

WO98/53039 discloses a method of producing soap, in which when molten soap is injected through a nozzle into a mold from the top of the mold, the mold is vertically moved down in accordance with the liquid level of molten soap injected so that the tip of the nozzle may always be positioned immediately above the liquid level. In this method, too, molten soap remains in the nozzle after mold filling, giving rise to necessity to remove solidified soap before the next shot.

SUMMARY OF THE INVENTION

An object of the present invention is to provide an apparatus and a method for producing soap cakes which does not allow molten soap to stagnate or remain in the gate of a mold after completion of filling the mold with molten soap.

The present invention provides an apparatus for producing a soap cake comprising a mold which has a cavity of prescribed shape, a feed passage for feeding molten soap to said cavity, and means for pushing molten soap remaining in said feed passage in the step of feeding molten soap into said cavity to remove molten soap remaining in said feed passage.

The present invention provides an apparatus for producing a soap cake comprising a cavity of prescribed shape and a molten soap feed passage leading to said cavity, said passage including a feed port for feeding molten soap and a gate, wherein a gate pin capable of shutting the connection between said feed port and said cavity is slidably provided in said gate and configured to remove molten soap remaining in said feed passage when it advances in said gate in the step of feeding molten soap into said cavity.

The present invention provides a mold for molding a soap cake comprising a cavity of prescribed shape, a molten soap feed port open to the outside, and a gate, wherein a gate pin capable of shutting the connection between said feed port and said cavity is slidably provided in said gate, the advancing direction of said gate pin making an angle of 0 to 90° with the flowing direction of the molten soap in said gate.

The present invention provides a method of producing a soap cake which comprises:

feeding molten soap to a mold having a cavity of prescribed shape, a gate leading to said cavity, and a gate pin slidably provided in said gate, said feeding being through said gate, and, simultaneous with said feeding, pushing said gate pin through said gate to plug said gate thereby to stop said feeding and to press the molten soap remaining in said gate into said cavity.

The present invention provides a method of producing a soap cake which comprises:

feeding molten soap to a mold having a cavity of prescribed shape, a gate leading to said cavity, a gate pin slidably provided in said gate, said feeding being through said gate, and simultaneous with said feeding, pushing said gate pin through said gate to plug said gate thereby to stop said feeding or simultaneously with pushing said gate, removing the molten soap remaining in said gate out of said mold by suction.

The present invention provides a method of producing a soap cake comprising feeding molten soap to the cavity of prescribed shape of a mold through a feed passage leading to said cavity and solidifying the molten soap, wherein said feed passage is formed of at least a gate which is formed in said mold and leads to said cavity and an injection nozzle connecting to said gate, said gate and said injection nozzle being each adapted to be plugged to expel any molten soap remaining in said gate and said injection nozzle.

The present invention provides an apparatus for producing a soap cake comprising a mold for molding molten soap into a prescribed shape and a feed pipe for feeding molten soap to said mold, wherein said mold has a molten soap feed port, said feed pipe has a nozzle which sticks out from part of said feed pipe with its diameter decreasing toward the tip thereof and a plug which has substantially the same shape as the inner shape of said nozzle and is slidably disposed in said nozzle, said nozzle is capable of being inserted into said feed port of said mold, and at least one of said mold and said nozzle is movable to join with each other and separate from each other.

BRIEF DESCRIPTION OF THE DRAWINGS

The present invention will be more particularly described with reference to the accompanying drawings, in which.

DETAILED DESCRIPTION OF THE PREFERRED EMBODIMENTS

Figure 1:
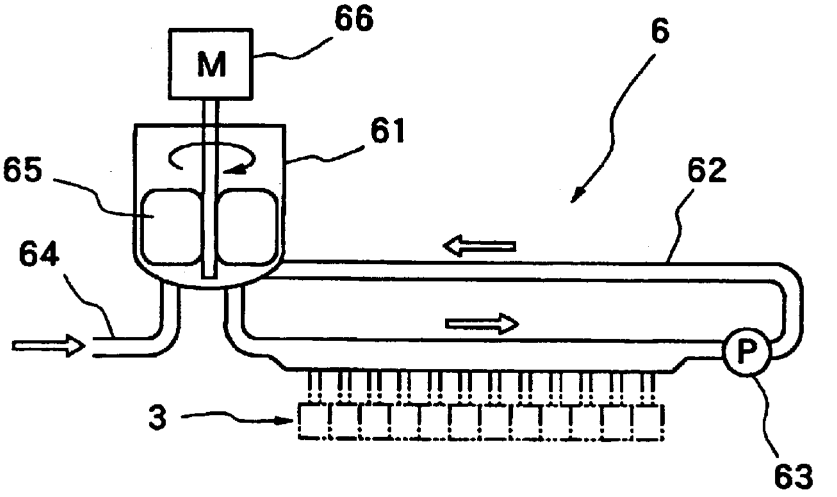
FIG. 1 is a schematic view of an embodiment of the molten soap circulating section of an apparatus for producing soap cakes according to the present invention.

The present invention will be described based on its preferred embodiments with reference to the accompanying drawings. The apparatus according to the first embodiment of the invention comprises a molten soap circulating section, a molten soap injecting section which is connected to the circulating section, and a molding section having a mold for molding the molten soap fed from the injecting section into a prescribed shape. FIG. 1 shows the molten soap circulating section of the apparatus according to the first embodiment, which is suitable to produce aerated soap.

The circulating section 6 shown in FIG. 1 has a storage tank 61, a circulating duct 62 connected to the storage tank 61 and forming a closed loop a part of which passes through the storage tank 61, and a circulating pump 63 provided in the circulating duct 62. A feed duct 64 for feeding molten soap having been bubbled in a bubbling section (not shown) is connected to the storage tank 61. Stirring blades 65 are provided in the storage tank 61. The stirring blades 65 are driven by a motor 66 to revolve in a prescribed direction. To the circulating duct 62 are connected a plurality of molten soap injecting sections 3 such that the molten soap supply from the circulating duct 62 into each injecting section 3 may be switched on and off. Both the circulating section 6 including the storage tank 61 and the circulating duct 62 and the injecting sections 3 are maintained at a predetermined temperature with respective heat retainers, such as a warm water jacket or a heater.

Figure 2:
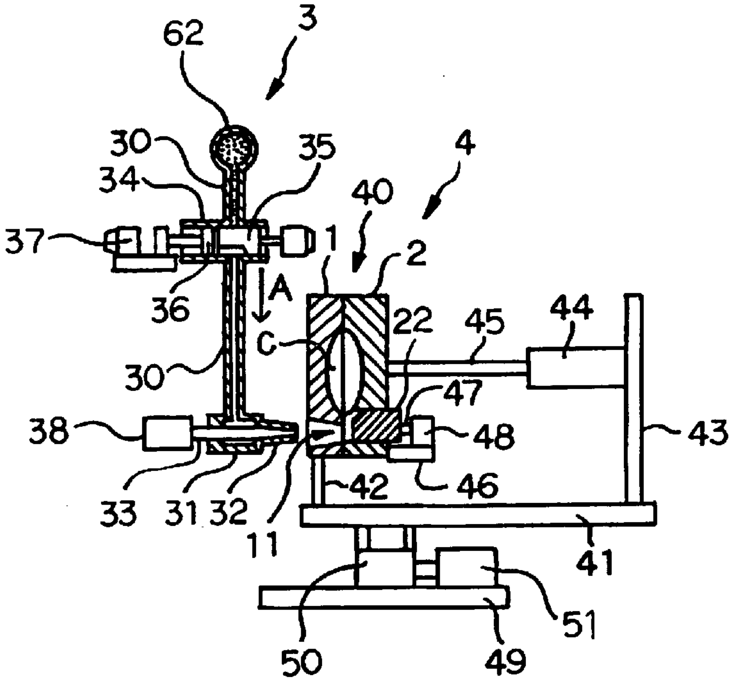
FIG. 2 schematically shows an embodiment of the injecting section and the molding section of the apparatus for producing soap cakes according to the present invention.

As shown in FIG. 2, each injecting section 3 has a feed pipe 30, one end of which is connected to the circulating duct 62, and the other end forms a molten soap reservoir 31. An injection nozzle 32 sticks out of the reservoir 31. The injection nozzle 32 has a truncated cone shape with the diameter decreasing toward the tip. A plug 33 shaped to the inner shape of the nozzle 32 is disposed in the nozzle 32. The plug 33 is moved back and forth by a hydraulic cylinder 38 attached to the rear end of the plug 33. As the plug 33 moves backward, there is formed a space between the nozzle 32 and the plug 33, through which molten soap is fed to a molding section 4 described infra. As the plug 33 moves forward, it fits in with the nozzle 32 with no gap left therebetween thereby to stop the molten soap feed. In other words, molten soap supply is fed and shut off by the reciprocal motion of the plug 33.

The feed pipe 30 has a combination of a cylinder 34 and a piston 36, which is an example of set-up volume feeders, in the upstream of the injection nozzle 32 with respect to the molten soap flow direction indicated by arrow A. The cylinder 34 is provided across the feed pipe 30. A rotary valve 35 is provided in the cylinder 34 so that the cylinder 34 may connect to either the upstream or the downstream of the feed pipe 30. The piston 36 is provided to make back and forth sliding strokes in the cylinder 34. As stated, the cylinder 34 and the piston 36 constitute a unit for feeding a set-up volume of molten soap. A servo motor 37 attached to the rear end of the piston 36 precisely controls the reciprocal motion of the piston 36. As the piston 36 is drawn, there is formed a space in the cylinder 34 for receiving molten soap. On filling the space with molten soap, the piston 36 is pushed to inject the molten soap into the cavity of a mold 40 (described later) under pressure. The volume of the molten soap to be injected into the cavity is decided by the backward or forward stroke of the piston 36. Specifically, the volume to be fed is decided by (1) a method in which the piston position before withdrawal is taken as an origin, and the feed volume is decided by the backward stroke of the piston or (2) a method in which the piston position after withdrawal is taken as an origin, and the feed volume is decided by the forward stroke of the piston. Where the molten soap to be metered is aerated molten soap, that is, a compressible fluid, it is preferred for obtaining improved accuracy of a product weight to use the method (1) and to decide the origin so as to minimize the amount of the molten soap remaining in the cylinder when the piston is at the origin.

Figure 3:
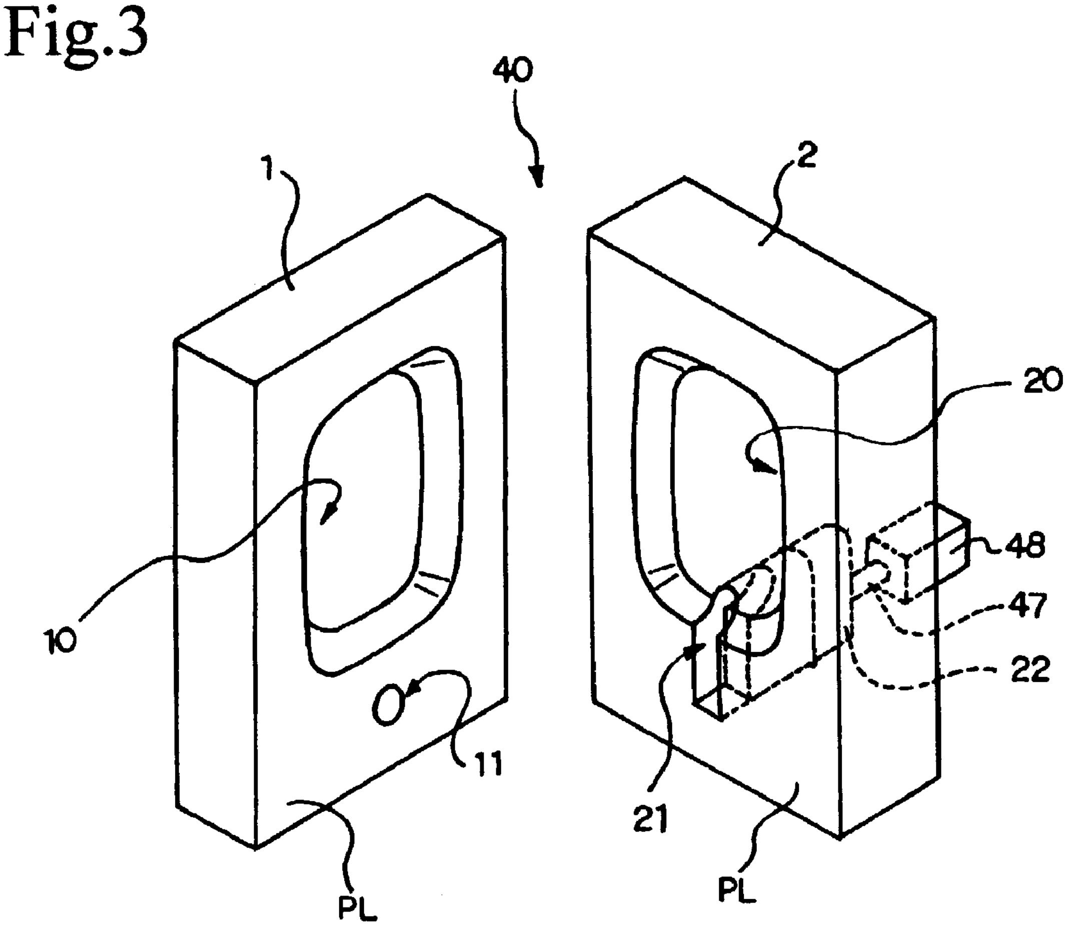
FIG. 3 is a perspective of a mold in its opened state.

The molding section 4 has a mold 40 for shaping and solidifying the molten soap fed from the injecting section 3 into a prescribed shape. FIG. 3 illustrates the mold 40 in its opened state. The mold 40 is a split mold made of a pair of splits, a first split 1 and a second split 2. Each split is made of a rigid material such as metal and has a rectangular block shape with a depression 10 or 20 in its central portion. The depressions 10 and 20 are shaped to provide a cavity (not shown) in agreement with the contour of a soap cake to be produced when the first split 1 and the second split 2 are joined together on their parting faces PL. While not shown in the Figure, each depression has narrow slits and/or small holes for air ejection or suction.

The first split 1 has a nozzle insert port 11 which pierces the outer periphery of the depression 10 in the thickness direction and opens to the outside. The nozzle insert port 11 serves as a port for feeding molten soap. The diameter of the nozzle insert port 11 increases gradually toward the outside to make an inner shape in which the injection nozzle 32 is fitted. The second split 2 has a gate 21 of rectangular cross-section engraved on part of its parting face PL. The gate 21 pierces the thickness of the second split 2 and leads to the depression 20. The nozzle insert port 11 and the gate 21 are made in the respective splits in such a configuration that the gate 21 connects the nozzle insert port 11 and the cavity when the two splits are assembled together. There is thus formed in the mold 40 a feed passage including the nozzle insert port 11 and the gate 21 through which molten soap is fed.

A gate pin 22 whose contour is the same as the inner shape of the gate 21 is disposed in the gate 21. The gate pin 22 is made of metal, plastic, etc. The rear end of the gate pin 22 is fixed to the tip of a piston 47 which is attached to a cylinder 48 so that the gate pin 22 slides back and forth within the gate 21. With the gate pin 22 in its withdrawn state, the nozzle insert port 11 connects to the cavity C through the gate 21. With the gate pin 21 reaching full stroke, the connection between the nozzle insert port 11 and the cavity C is shut. That is, the gate pin 21 serves as a means for shutting the interconnection between the nozzle insert port 11 and the cavity C.

While not shown, a narrow slit is made on the parting face PL of the first split 1 as an air vent. The air vent is preferably made in the upper part of the first split 1. While not shown, a passageway for cooling water circulation is provided in the blocks making the spits 1 and 2.

Returning to FIG. 2, the first split 1 of the mold 40 is a stationary part, being fixedly supported on its base by a supporting plate 42 upstanding on a base plate 41. On the other hand, the back side of the second split 2 is fixed to the tip of a piston 45 of a hydraulic cylinder 44. The hydraulic cylinder 44 is fixed to a supporting plate 43 upstanding on the base plate 41 such that the piston 45 slides in the direction perpendicular to the plane of the supporting plate 43. Accordingly, the second split 2 is a horizontally movable part. The mold 40 is set with the nozzle insert port 11 positioned below the cavity C so that molten soap is fed upward from the lower part of the cavity C.

A cylinder supporting plate 46 is horizontally provided in the lower part of the second split 2, on which the cylinder 48 is fixed so that the piston 47 may slide horizontally. As previously described, the tip of the piston 47 is connected to the rear end of the gate pin 22 of the second split 2.

The base plate 41 is fixedly attached on a slider 50 which is slidably mounted on a mount 49. The slider 50 slides on the mount 49 by the motion of a hydraulic cylinder 51 which is also mounted on the mount 49. The whole molding section 4 including the mold 40 is thus capable of horizontally sliding to be connected to or separated away from the injection nozzle 32 of the injecting section 3. As a result, molding operations such as opening of the mold 40 can be performed smoothly, leading to shortening of a production cycle.

Production of aerated soap cakes by use of the above-described apparatus will then be described. Circulation of molten soap in the circulating section 6 is described first with reference to FIG. 1. Molten soap that has been bubbled in the bubbling section (not shown) to have a large number of bubbles dispersed therein is supplied to the storage tank 61 through the feed duct 64 and stored there. The molten soap is agitated in the storage tank 61 by means of the stirring blades 65 to keep the bubbles in a uniformly dispersed state. Part of the molten soap is delivered to the circulating duct 62 by means of the circulating pump 63. It follows that the molten soap stored in the storage tank 61 circulates through the circulating duct 62 while passing through the storage tank 61. By this circulation the molten soap is prevented from stagnating in the feed piping even when the operation of aerated soap production is suspended in case of some trouble, whereby shearing force is always exerted on the aerated molten soap to prevent separation into gas and liquid. In the present embodiment, in particular, since shearing force is applied to the molten soap by the circulation, there is an advantage that the time of applying the shearing force to molten soap is controllable through adjustment of, for example, the flow velocity of the molten soap. That is, maintaining aerated molten soap, which is a compressible fluid having low storage stability, under shearing force for a long period of time makes it possible to retain the state of bubbles. With no shearing force applied, gathering of bubbles or separation into gas and liquid occurs unavoidably. In this way, a shearing force can be exerted on the molten soap in an effective manner by controlling the time of shearing force application while the molten soap is circulated. As a result, the bubbles can be kept in a satisfactory dispersed state in the molten soap in the storage tank 61, and the satisfactory state can be maintained for a long period of time. Separation into gas and liquid could be suppressed to some extent simply by stirring with the stirring blades 65 in the storage tank 61, which cannot be seen as sufficient. If the molten soap is agitated with the stirring blades 65 to a degree sufficient for preventing gas-liquid separation or gathering of bubbles, the molten soap would entrain air bubbles, resulting in variation of specific gravity of the molten soap. Therefore, it is desirable that the stirring in the storage tank 61 be so mild as to avoid air entrapment and that prevention of gas-liquid separation be achieved by circulation in the circulating duct 62.

Molten soap having a great number of bubbles dispersed therein can be prepared by, for example, the method described in JP-A-11-43699, filed by the assignee. Various gases are useful for aerating molten soap. In particular, an inert gas, especially a non-oxidizing inert gas such as nitrogen gas, is effective to prevent the molten soap components from being oxidatively decomposed on heating to generate offensive odors, etc. Use of an inert gas for aerating is particularly effective where a perfume component susceptible to oxidative decomposition is compounded as a component of aerated soap.

It is preferred that the circulating molten soap be maintained at a temperature of 55 to 80° C., particularly 60 to 70° C., to prevent the molten soap from solidifying at the tip of each feed nozzle hereinafter described and to prevent oxidation of soap and deterioration of perfume.

In this connection, the molten soap is preferably heated to and maintained at a temperature higher than the melting point by 1 to 20° C., particularly 2 to 5° C., while circulating for the same reason as stated above.

Circulation of the molten soap is preferably such that the ratio of the storage tank 61 capacity S ($m^3$) to the circulating flow rate V ($m^3$/hr), S/V ratio (hr), be in the range of from 0.01 to 5 in order to prevent bubbles' gathering and separation into gas and liquid.

In connection to the circulating flow rate, the molten soap is preferably circulated in the circulating duct 62 at a flow velocity Vd of 0.02 to 5 m/s, particularly 0.05 to 0.8 m/s. Below the lower limit, a pressure drop may occur easily when the molten soap is dispensed to the feeding section 3. Above the upper limit, the equipment may have an increased scale, and there is a high possibility that the molten soap entraps air bubbles while circulating. For the same reasons, the circulating duct 62 preferably has a cross sectional area of 10 to 200 $cm^2$, particularly 20 to 180 $cm^2$.

The molten soap being circulated preferably has a shear rate of 0.2 to 500 $s^{-1}$, particularly 0.3 to 100 $s^{-1}$, especially 0.3 to 20 $s^{-1}$, to prevent bubbles' gathering and separation into gas and liquid. The shear rate D is calculated from D=2Vd/d, wherein Vd is a circulating flow velocity (m/s) of the molten soap, and d is the inner diameter (m) of the circulating duct 62. It is preferred to appropriately dispose a static mixer in the circulating duct 62 for applying shear within the above shear rate range.

Before molding, the nozzle 32 of the injecting section 3 and the mold 40 of the molding section 4 are separate as shown in FIG. 2. In the injecting section 3, the connection between the cylinder 34 and the circulating duct 62 is shut by the rotary valve 35, the piston 36 in the cylinder 34 is at a standby position, and the plug 33 is completely inserted into the nozzle 32 to shut the molten soap supply. In the molding section 4, the hydraulic cylinder 44 operates to push the piston 45 thereby closing the split mold 40. Cooling water is circulating through the passageway of each split. The hydraulic cylinder 48 operates to withdraw the piston 47 to draw back the gate pin 22 attached to the tip of the piston 47 from the gate 21. There is thus formed a feed passage from the nozzle insert port 11 to the cavity C through the gate 21.

Figure 4A:
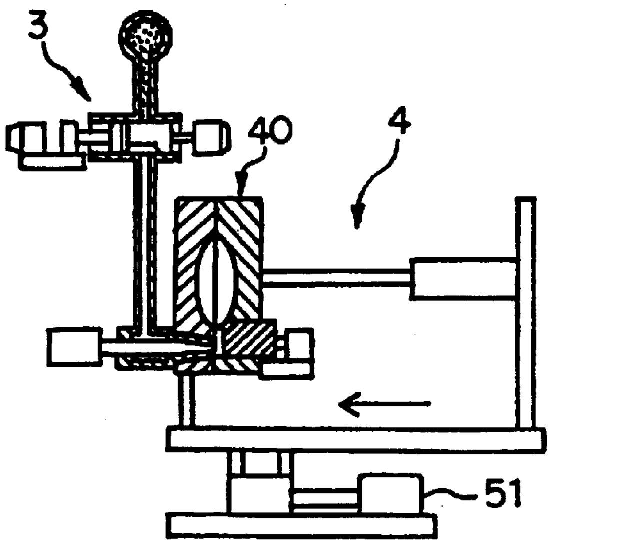
FIG. 4(*a*) shows the sections of FIG. 2 at the start of molding, and FIG. 4(*b*) is an enlarged view of the essential part of FIG. 4(*a*)
Figure 4B:
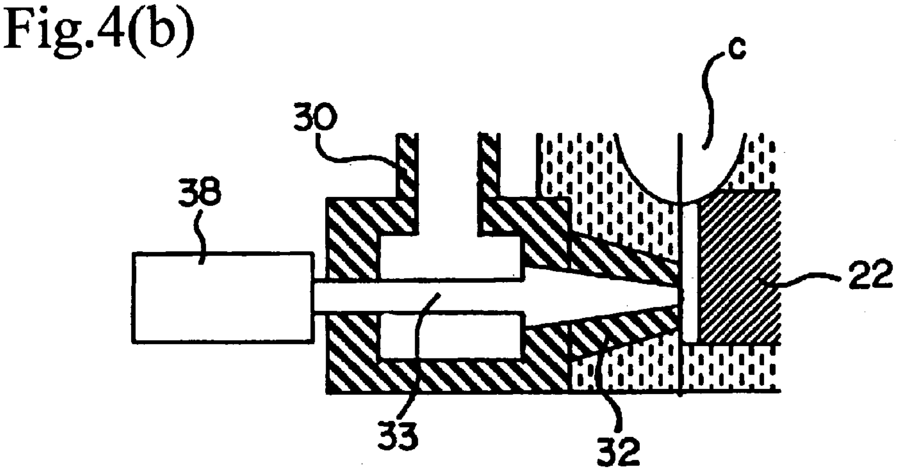

Then, as shown in FIG. 4(*a*), the hydraulic cylinder 51 of the molding section 4 brings the closed mold 40 close to the injecting section 3 until the nozzle 32 completely fits into the nozzle insert port 11. In this state, no gap is left between the nozzle 32 and the nozzle insert port 11 as shown in FIG. 4(*b*). Therefore, there is no possibility that molten soap leaks between the nozzle 32 and the nozzle insert port 11 or any molten soap remains between the nozzle 32 and the nozzle insert port 11 after molding.

Figure 5:
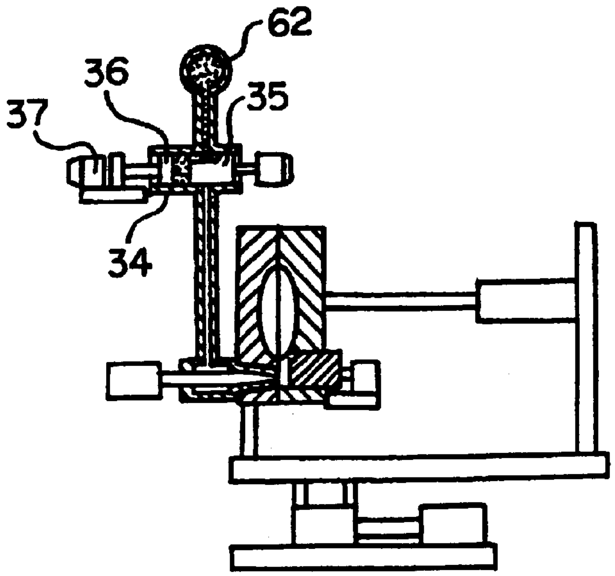
FIG. 5 shows the sections of FIG. 2, in which molten soap is filling a cylinder.

In the above-described state, part of the molten soap circulating in the circulating duct 62 is delivered to the injecting section 3. This operation is illustrated in FIG. 5. In order to deliver the molten soap to the injecting section 3, the rotary valve 35 is rotated by 180° to interconnect the cylinder 34 and the circulating duct 62. At the same time, the servo motor 37 operates to withdraw the piston 36. As a result, a space is created in the cylinder 34, into which the molten soap flows. The piston 36 is withdrawn until a predetermined amount of the molten soap flows into the cylinder 34.

Figure 6A:
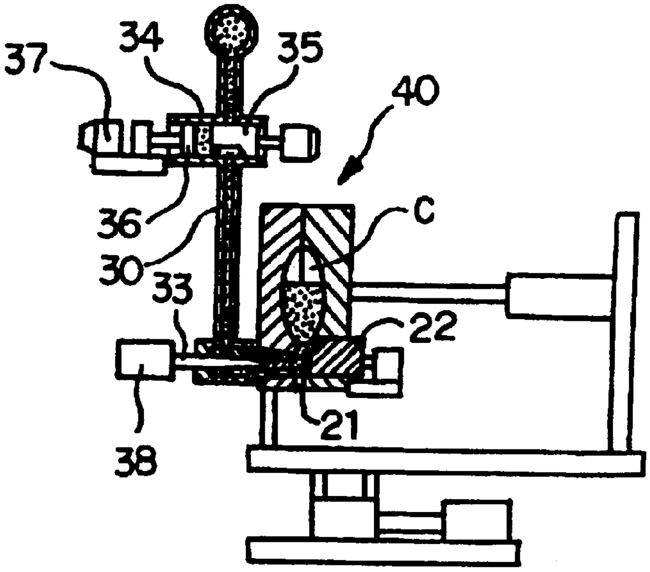
FIG. 6(*a*) shows the sections of FIG. 2, in which molten soap is being injected into the cavity, and FIG. 6(*b*) is an enlarged view of the essential part of FIG. 6(*a*)
Figure 6B:
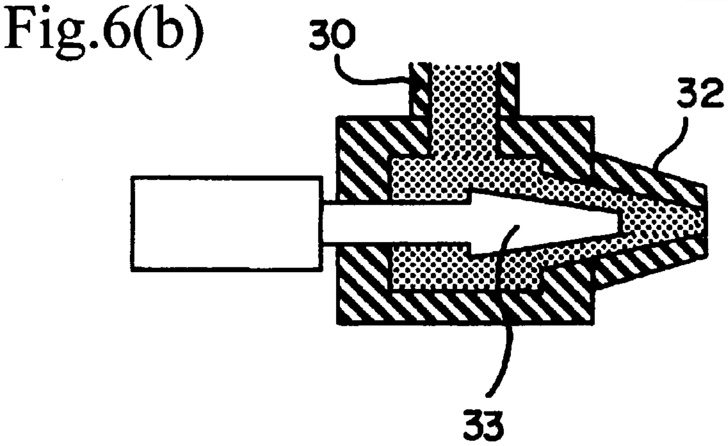

On filling the cylinder 34 with the predetermined amount of the molten soap, the servo motor 37 is stopped to stop the withdrawal of the piston 36. As shown in FIG. 6(*a*), the rotary valve 35 is then rotated in the reverse direction by 180° to cut the connection between the cylinder 34 and the circulating duct 62 while, on the other hand, making a connection between the cylinder 34 and the downstream nozzle 32. The hydraulic cylinder 38 operates to draw the plug 33 from the nozzle 32 to create a gap between the plug 33 and the nozzle 32 as illustrated in FIG. 6(*b*). As a result, there is provided a feed passage from the cylinder 34 to the cavity C through the feed pipe 30, the nozzle 32, and the gate 21. The servo motor 37 operates to push the piston 36 forward through the cylinder 34, thereby to inject the molten soap in the cylinder 34 into the cavity C of the mold 40 through the feed passage. As mentioned above, the amount of the molten soap injected depends on the stroke of the piston 34, and the stroke of the piston 34 is accurately controlled by the servo motor 37. Accordingly, soap cakes of constant weight can easily be produced by the present invention.

According to the present embodiment, injection of the molten soap into the cavity is carried out in three divided stages, initial, intermediate, and final. In every stage, the feed rate (injection rate) is adjusted by controlling the operating speed of the set-up volume feeder, i.e., the piston traveling speed in the cylinder 34 by the servo motor 37. In the initial stage of feeding, the molten soap is fed at a low rate so as not to cause big bubbles perceptible to the eye to be generated and to remain in the resulting soap cake. If the feed rate in the initial stage is too high, the molten soap will spring up and bubble up in the cavity C, and the bubbles easily remain in the product. To avert this, the molten soap is fed at a low rate in the initial stage. The big bubbles perceptible to the eye as referred to above are usually about 0.5 to 10 mm in diameter.

In the intermediate stage of feeding, the molten soap is injected at a higher rate than in the initial stage. Taking bubbling prevention into primary consideration, a low feed rate is preferred in the intermediate stage, too. However, once the cavity C is charged with molten soap to some extent, the molten soap hardly bubbles up because of its own weight even where the feed rate is somewhat increased. Where, in particular, the molten soap is injected from the bottom of the cavity C toward the top as in the present embodiment, bubbling is suppressed further. Hence, from the standpoint of increasing productivity, the molten soap is allowed to be fed at a higher rate than in the initial stage. The time when the molten soap has filled about 5 to 30% of the cavity C capacity is the timing for starting the initial stage.

In the final stage of injection feed, the molten soap is fed at a lower rate than in the intermediate stage for the following reason. In the final stage, the cavity C has been mostly filled with the molten soap, leaving only a small space unfilled. If the molten soap continues being fed at a high rate in the final stage, there is a fear that the air vent (not shown) of the mold may be blocked by the molten soap, failing to allow residual air in the cavity C to escape. Remaining air would cause such defects as depressions on the resulting soap cake. To avoid this, the injection is conducted at a lower rate than in the intermediate stage. The time when about 70 to 95% of the cavity C capacity has been filled with the molten soap is the timing for starting the final stage.

Defect-free soap cakes can be produced with good productivity by the above-described sophisticated manner of injection.

The rate of feeding the molten soap may be adjusted without control on the motion of the piston 36 in the cylinder 34. For example, the feed rate adjustment can be achieved by appropriately moving the plug 33 back and forth to change the space between the nozzle 32 and the plug 33. This manner of adjustment is shown in FIG. 6(*b*). That is, the feed rate can be adjusted by controlling the pressure loss or friction of the molten soap. To make the control more accurate, it is effective to move the plug 33 by using a servo motor. In this case, since a constant amount of molten soap is being fed into the cavity C by means of the set-up volume feeder composed of the cylinder 34 and the piston 36, the feed rate control with the plug 33 is conducted while the constant amount of the molten soap is flowing in the nozzle 32. According to this manipulation, it is easy to feed the constant amount of molten soap to the cavity C while accurately controlling the feed rate.

Figure 7:
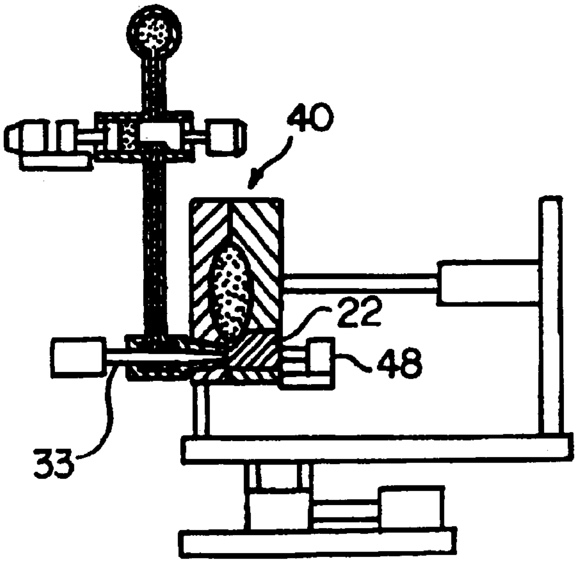
FIG. 7 shows the sections of FIG. 2 at the end of filling the cavity with molten soap.

Upon charging the cavity C with the given amount of the molten soap, the plug 33 is completely inserted into the nozzle 32 to stop the molten soap feed as shown in FIG. 7. Immediately thereafter or almost simultaneously with the feed stopping, the hydraulic cylinder 48 operates to push the gate pin 22 into the gate 21 to force the molten soap remaining in the gate 21 into the cavity C. As a result, the molten soap feed passage in the mold 40 is completely shut off with no space left. In the injecting section 3, too, the injection nozzle 32 is completely plugged up with the plug 33 with no gap left, i.e., with no molten soap allowed to exist in the nozzle 32. In other words, when the molten soap injection completes, the molten soap is expelled from the feed passage in the mold 40 and from the injection nozzle 32, without being allowed to remain there. This means that there is no need to remove solidified soap from the mold or the injection nozzle before starting the next shot, and increased productivity results. Because fresh molten soap can be fed in the next shot, molding is conducted smoothly, and the resulting soap products enjoy homogeneity. Having no molding flash, the resulting soap cake needs no trimming. Neither does the mold require cleaning for each shot. As a result, high productivity is achieved.

The amount of the molten soap to be injected into the cavity C before pushing the gate pin 22 may be equal to or slightly more or less than the capacity of the cavity C. Even where this amount of the molten soap is slightly less than the cavity capacity, the cavity C is finally filled up by pushing the molten soap remaining in the gate 21 by the gate pin 22. Conversely, even when this amount of molten soap is slightly larger than the cavity capacity, the molten soap remaining in the gate 21 can be forced into the cavity C where the molten soap is a compressible fluid containing bubbles. Accordingly, in using molten soap with low compressibility (for example, bubble-free molten soap), it is advisable that the amount of the molten soap to be injected into the cavity C before the gate pin 22 is pushed forward be equal to or slightly smaller than the cavity C capacity.

After the molten soap is injected into the cavity under pressure, a pressure is exerted toward the gate 21. In order to push the gate pin 22 into the gate 21 and to maintain that state, it is necessary to impose a force resistant against the pressure to the gate pin 22. The force to be imposed can be minimized by pushing the gate pin 22 in the direction perpendicular to that of the downward pressure. Accordingly, in this embodiment the gate pin 22 is moved horizontally. That is, the advancing direction of the gate pin 22 makes a right angle with the flowing direction of the molten soap in the gate 21 (the flowing direction being in parallel to the direction of the pressure exerted by the molten soap). Since the mechanism for pushing and pulling the gate pin 22 is provided by the side of the mold 40 for pushing the gate pin 22 horizontally, there is created a space below the mold 40. This space is beneficial for molding workability.

Figure 8:
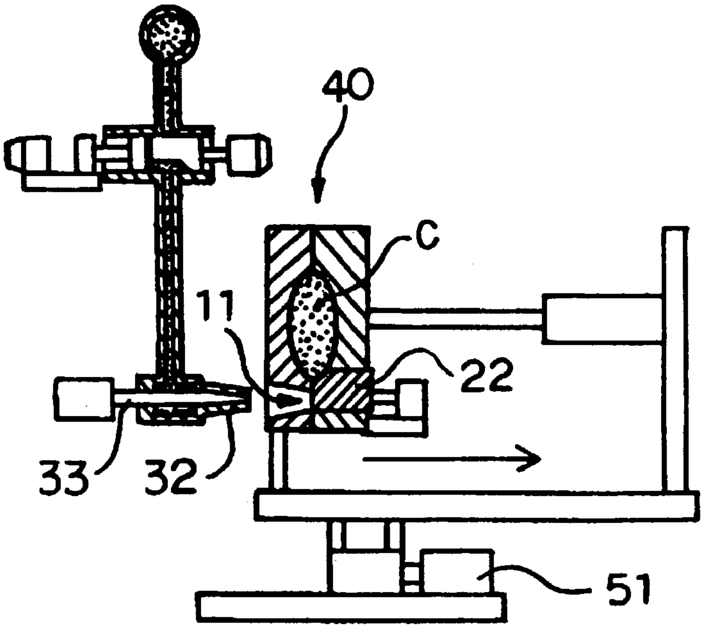
FIG. 8 shows the molding section separated from the injecting section.

With the gate pin 22 inserted in the gate 21, and the plug 33 inserted in the nozzle 32, the hydraulic cylinder 51 of the molding section 4 operates to separate the mold 40 from the nozzle 32 as shown in FIG. 8. Meantime, the molten soap in the cavity C is solidified.

Figure 9:
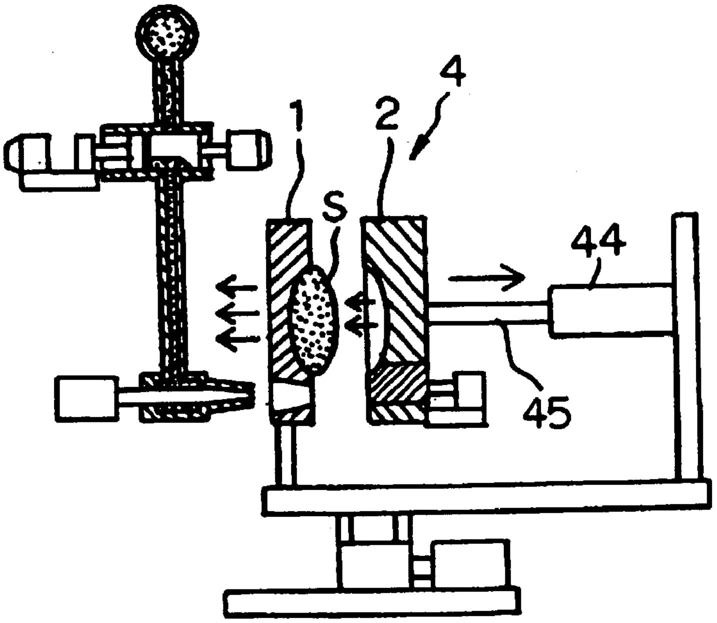
FIG. 9 shows the sections of FIG. 2, in which the mold is being opened.

When solidification of the molten soap has proceeded to some extent, the hydraulic cylinder 44 of the molding section 4 operates to withdraw the piston 45 to open the mold 40 into the first split 1 and the second split 2 as shown in FIG. 9. Simultaneously, the solidified molten soap cake S is sucked to the first split 1 through the slits (not shown) formed on the cavity-forming wall of the first split 1, and air is ejected toward the soap cake S from the slits (not shown) formed on the cavity-forming wall of the second split 2 to facilitate release of the soap cake S from the second split 2. The soap cake S is thus held in the depression 10 of the first split 1.

Figure 10:
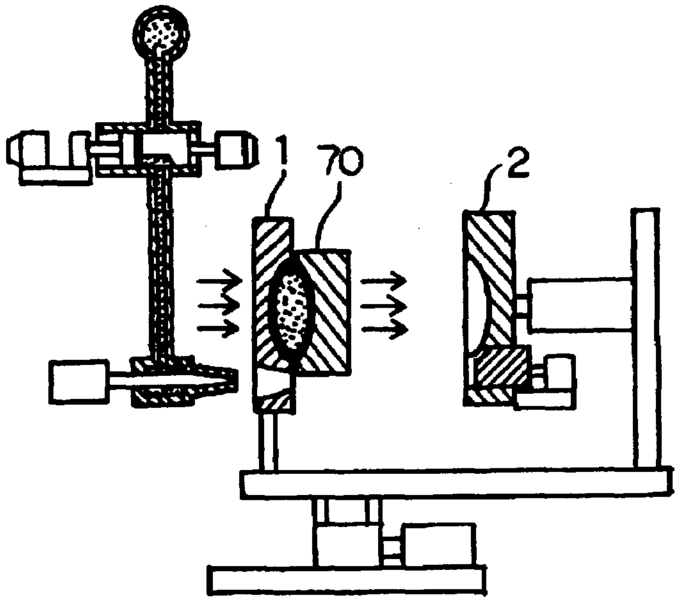
FIG. 10 shows the sections of FIG. 2, in which a soap cake is being transferred to a receiving member.

A receiving member 70 having a depression of the same shape as that of the second split 2 is brought into contact with the parting face of the first split 1 as shown in FIG. 10. Under this state, the soap cake S is sucked to the receiving member 70 through the splits (not shown) formed on the depression-forming wall of the receiving member 70 while air is ejected to the cake S through the slits (not shown) of the first splits 1 to accelerate release of the cake S from the split 1, thereby transferring the cake S on the first split 1 to the receiving member 70. Then the first and the second splits 1 and 2 are joined to make the split mold 40 ready to receive the next shot of molten soap as shown in FIG. 2.

In a modification of the above-described embodiment, the order of pushing the plug 33 and the gate pin 22 may be reversed. In the modified method, simultaneously with completing feeding the molten soap to the cavity C, the gate pin 22 is pushed to clog the gate 21, leaving no space in the gate 21. Synchronously with the pushing of the gate pin 22, the piston 36 of the injecting section 3 is withdrawn. As a result, instead of being forced into the cavity C, the molten soap in the gate 21 is sucked backward into the injecting section 3. According to this modification, an increase in inner pressure of the cavity C caused by pushing the gate pin 21 can be minimized, and the resulting soap cakes can be made more homogeneous. Even where the temperature of the mold is low so that the molten soap remaining in the gate begins to solidify, the molten soap containing a solidified portion is prevented from entering the cavity C. This is also effective to make the resulting soap cake homogeneous.

After the molten soap is pressed out of the gate 21, the hydraulic cylinder 38 operates to completely plug the nozzle 32 with the plug 33, allowing no molten soap to remain in the nozzle 32. Then, the operations shown in FIGS. 8 through 10 follow.

Compounding components which can make up the aerated soap include fatty acid soaps, nonionic surface active agents, inorganic salts, polyols, non-soap type anionic surface active agents, free fatty acids, perfumes, and water. If desired, such additives as antimicrobials, pigments, dyes, oils, and plant extracts, can be added appropriately.

Second to sixth embodiments of the present invention will then be described by referring to FIGS. 11 through 16. These embodiments will be described only with reference to differences from the first one. Otherwise, the description on the first embodiment applies appropriately. In FIGS. 11 to 16, the same members as in FIGS. 1 to 10 are given the same numerals used in FIGS. 1 to 10.

Figure 11:
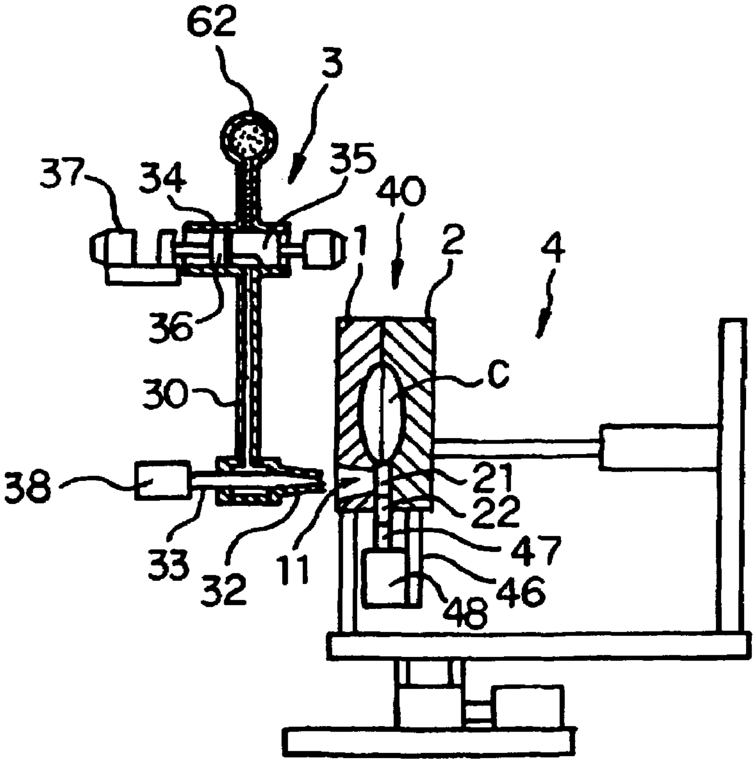
FIG. 11 is a schematic view of another embodiment of the injecting section and the molding section of the apparatus for producing soap cakes according to the present invention.
Figure 12:
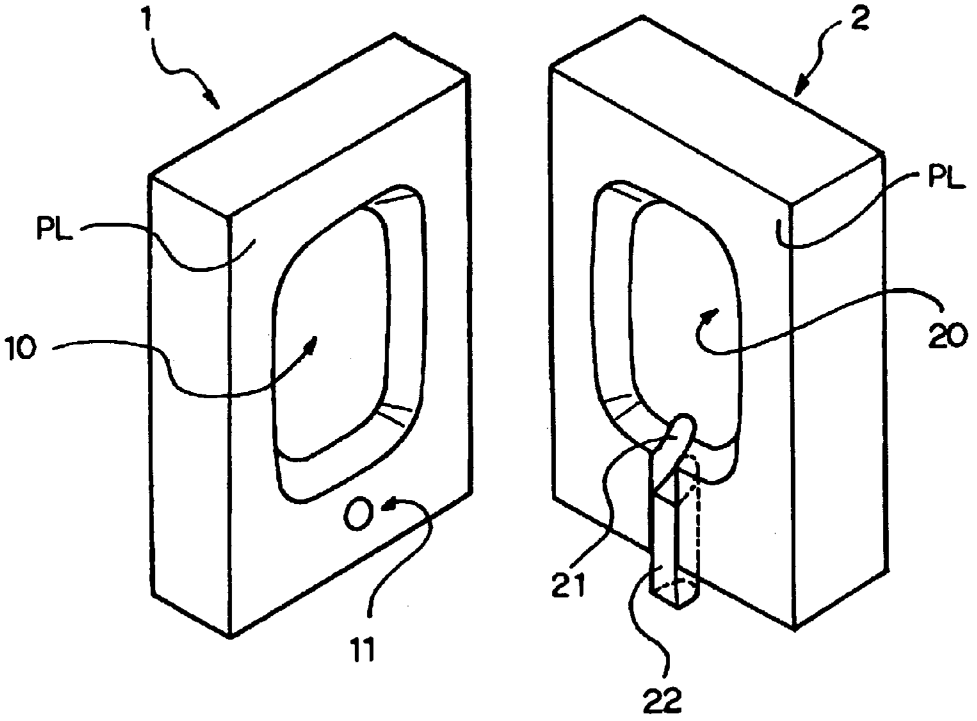
FIG. 12 is a perspective of another mold in its opened state.

The apparatus according to the second embodiment is the same as the first one except for the molding section 4 including the mold 40 as shown in FIG. 11. FIG. 12 shows the mold 40 used in the second embodiment in its opened state. The first split 1 is the same as in the first embodiment. The second split 2 is different from that used in the first embodiment as follows. The second split 2 has a gate 21 of semicircular cross-section engraved on part of its parting face PL. The gate 21 leads to the depression 20 at one end thereof and is open to the outside at the other end. The nozzle insert port 11 of the first split 1 and the gate 21 of the second split 2 are in such a configuration as to make a feed passage connecting the nozzle insert port 11, the gate 21, and the cavity when the two splits are assembled together. A gate pin 22 whose contour agrees with the inner shape (semicircular columnar shape) of the gate 21 is provided in the gate 21.

Referring back to FIG. 11, the lower end of the gate pin 22 is connected to the tip of a cylinder shaft 47 of a hydraulic cylinder 48 so that the gate pin 22 is movable in the gate 21. The hydraulic cylinder 48 is attached to a side of a supporting plate 46 hanging from the lower end of the second split 2. In this way, the gate pin 22 is vertically slidable in the second embodiment, while that in the first embodiment is horizontally slidable.

Production of soap cakes by use of the apparatus according to the second embodiment proceeds as follows. When the apparatus shown in FIG. 11 is in a state corresponding to FIG. 5, the rotary valve 35 is rotated by 180° to shut the interconnection between the cylinder 34 and the circulating duct 62 and to interconnect the cylinder 34 and the nozzle 32. Subsequently, the hydraulic cylinder 38 operates to draw the plug 33 from the nozzle 32 to create a gap between the plug 33 and the nozzle 32. As a result, there is provided a molten soap feed passage from the cylinder 34 to the cavity C through the peed pipe 30, the nozzle 32, and the gate 21. The servo motor 37 operates to push the piston 36 through the cylinder 34, thereby injecting the molten soap in the cylinder 34 into the cavity C of the mold 40 through the passage under pressure. Simultaneously with feeding a given amount of the molten soap to the cavity C, the plug 33 is completely inserted into the nozzle 32 to stop the molten soap feed. Immediately thereafter or almost simultaneous with the feed stopping, the hydraulic cylinder 48 operates to push up the gate pin 22 into the gate 21. As a result, the molten soap remaining in the gate 21 is pressed into the cavity C, and the gate 21 as a part of the molten soap feed passage is completely plugged by the gate pin 22, leaving no space for allowing the molten soap to exist. The injection nozzle 32 is also completely plugged by the plug 33, leaving no space for allowing the molten soap to exist. Afterwards the same procedures as in the first embodiment follow.

The second embodiment is advantageous in that the area of the gate 21 open to the cavity C is smaller than in the first embodiment so that the gate mark on the resulting soap cake is smaller. In this embodiment, however, the advancing direction of the gate pin 22 and the molten soap flowing direction in the gate 21 (which is in parallel to the direction of the pressure generated by the molten soap having been injected into the cavity C under pressure) make zero degree. This means that the gate pin 22 receives all the pressure of the molten soap exerted downward. Therefore, the force necessary to push the gate pin 22 up through the gate 21 and to maintain that state should be greater than that needed in the first embodiment. In other words, the angle formed between the advancing direction of the gate pin 22 and the molten soap flowing direction in the gate 21 can be selected appropriately within a range of from 0 to 90° with due consideration to the balance between (1) the force required to push the gate pin 22 through the gate 21 and to maintain that state and (2) the area of the gate mark made on the resulting soap cake. Out of that range of angle, the balance would be considerably destroyed, and the structure of the molding section 4 would have to be very complicated.

Figure 13:
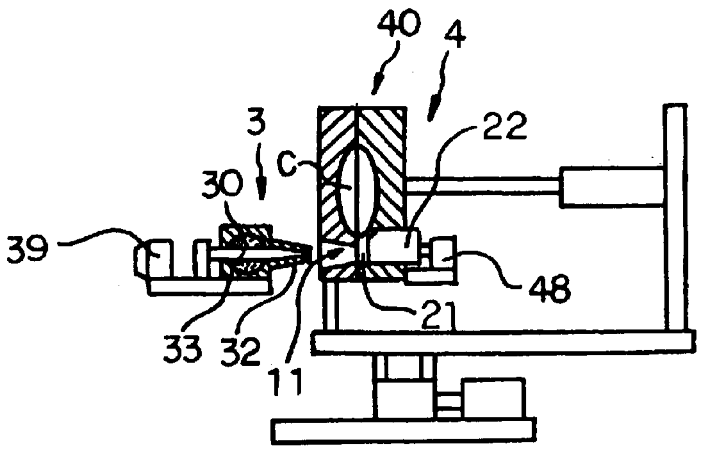
FIG. 13 illustrates still another embodiment of the injecting section and the molding section of the apparatus for producing soap cakes according to the present invention.

FIG. 13 shows the third embodiment. Unlike the first and second embodiments, the apparatus of the third embodiment has no circulating section. In addition, the configuration of the injecting section 3 differs from that of either the first or the second embodiment. The molding section is the same as in the first embodiment. In the third embodiment, the injecting section 3 has a feed pipe 30 directly connected to a molten soap storage tank (not shown in FIG. 13). The feed pipe 30 is equipped with a pressure pump (not shown), and molten soap is supplied to the injecting section 3 directly from the storage tank through the feed pipe 30 by the pressure pump. An injection nozzle 32 horizontally sticks out of the feed pipe 30. A plug 33 whose contour is the same as the inner shape of the nozzle 32 is provided in the nozzle 32. The plug 33 is connected to a servo motor 39 and is moved back and forth in the nozzle 32 by the servo motor 39.

When the apparatus of FIG. 13 is in a state corresponding to FIG. 5, the pressure pump operates to make molten soap flow in the feed pipe 30. The servo motor 39 operates to withdraw the plug 33 from the nozzle 32 to create a gap between the plug 33 and the nozzle 32. There is thus formed a molten soap feed passage from the feed pipe 30 to the cavity through the nozzle 32 and the gate 21. Since the molten soap in the feed pipe 30 is pressurized by the pressure pump, it is injected into the cavity C under pressure. Simultaneously with injecting a prescribed amount of the molten soap into the cavity C, the plug 33 is completely inserted into the nozzle 32 to stop the feed. Immediately thereafter or almost simultaneously with the feed stopping, the hydraulic cylinder 48 operates to push the gate pin 22 into the gate 21. As a result, the molten soap remaining in the gate 21 is forced into the cavity C, and the gate 21 as part of the feed passage for the molten soap is completely plugged by the gate pin 22, leaving no space for allowing the molten soap to remain. The injection nozzle 32 is also completely plugged by the plug 33, leaving no space for allowing the molten soap to exist. Afterwards the same procedures as in the first embodiment follow.

Unlike the first and second embodiments, the amount of molten soap to be fed into the cavity C and the feed rate are both controlled only by the stroke of the plug 33. Therefore, the reciprocal motion of the plug 33 is carried out by means of the servo motor 39 that is capable of more precise control than a hydraulic cylinder.

The third embodiment is advantageous over the first and second ones in that more fresh molten soap can be supplied for each shot and that the molten soap feed passage is simpler.

Figure 14:
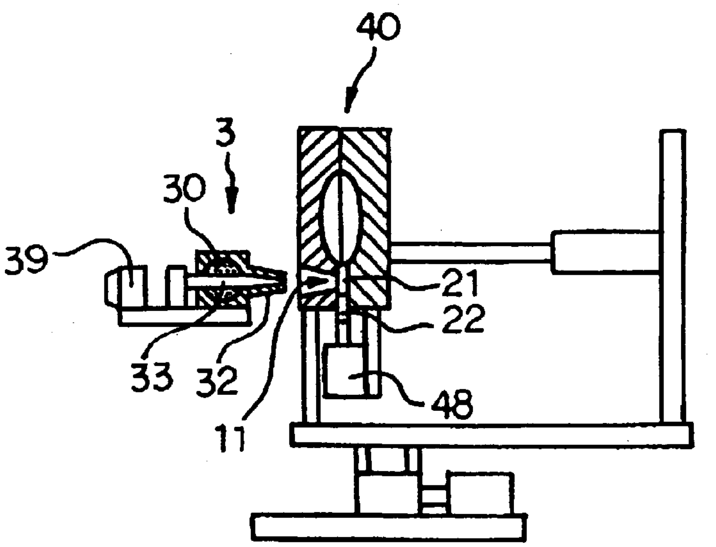
FIG. 14 shows yet still another embodiment of the injecting section and the molding section of the apparatus for producing soap cakes according to the present invention.

The fourth embodiment shown in FIG. 14 is a combination of the molding section 4 of the second embodiment shown in FIG. 11 and the injecting section 3 of the third embodiment shown in FIG. 13. The configuration of the apparatus of the forth embodiment and the method of producing soap cakes by use of this apparatus will be obvious to one skilled in the art from the description given to the second and third embodiments without particular explanation.

Figure 15:
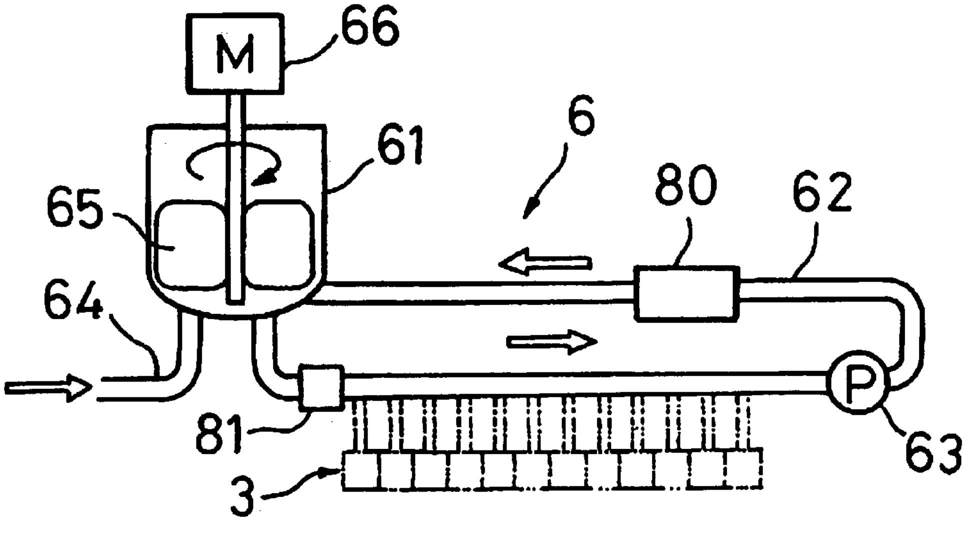
FIG. 15 shows another embodiment of the molten soap circulating section of the apparatus for producing soap cakes according to the present invention.

FIG. 15 shows an apparatus according to the fifth embodiment, in which the structure of the circulating section 6 differs from that of the first one. Specifically, the apparatus has a cooling unit 81 provided between the storage tank 61 and the injecting sections 3 for cooling the molten soap circulating in the circulating duct 62. More specifically, the cooling unit 81 is attached to the circulating duct 62 at a position between the storage tank 61 and the position where the feeding sections 3 are connected to the circulating duct 62 and immediately in front (the upstream) of the position where the injecting suctions 3 are connected to the circulating duct 62. The circulating duct 62 also has a heating unit 80 for heating the molten soap circulating through the circulating duct 62. The heating unit 80 is attached in the downstream of the position where the injecting sections 3 are connected to the circulating duct 62. That is, the circulating duct 62 has the cooling unit 81 in the upstream of the heating unit 80 in the molten soap circulating direction, and the injecting sections 3 are located between the cooling unit 81 and the heating unit 80. The heating temperature by the heating unit 80 is set higher than the temperature of the circulating duct 62 so that the temperature of the molten soap returning to the storage tank 61 from the circulating duct 62 may be the same as the temperature of the molten soap in the storage tank 61 (hereinafter referred to as a retained temperature). On the other hand, the cooling temperature by the cooling unit 81 is set lower than the retained temperature of the heat retainer which retains the circulating duct 62 warm. The molten soap is thus cooled to a temperature lower than the retained temperature by, for example, about 0.5 to 10° C. As a matter of course, the cooling temperature should be at or above the melting temperature of soap. A heat exchanger, etc. can be used as the heating unit 80. A heat exchanger, etc. can be used as the cooling unit 81.

According to this embodiment, since the molten soap is cooled to a temperature lower than that of the circulating molten soap (retained temperature) immediately before it is injected into the cavity of the mold, there is an advantage that the time required to solidify the molten soap in the cavity is made shorter than in the first embodiment. When, in particular, the molten soap is cooled to a temperature lower than the retained temperature by 0.5 to 10° C. immediately before being fed into the cavity, the time for keeping the molten soap still in the cavity, in which neither agitation nor shearing is applied, can be reduced. As a result, occurrence of bubbles' gathering and gas-liquid separation which might occur before solidification completes can be reduced. It is noted, however, that cooling molten soap by the cooling unit 81 is liable to involve the fear that the fluidity of the molten soap in the circulating duct 62 reduces, failing to secure smooth circulation of the molten soap. Therefore, the heating unit 80 for heating the molten soap is provided independently of the heat retainer for the circulating duct 62. It is provided in the downstream of the position where the injecting sections 3 are connected to the circulating duct 62, thereby securing smooth circulation of the molten soap.

Figure 16:
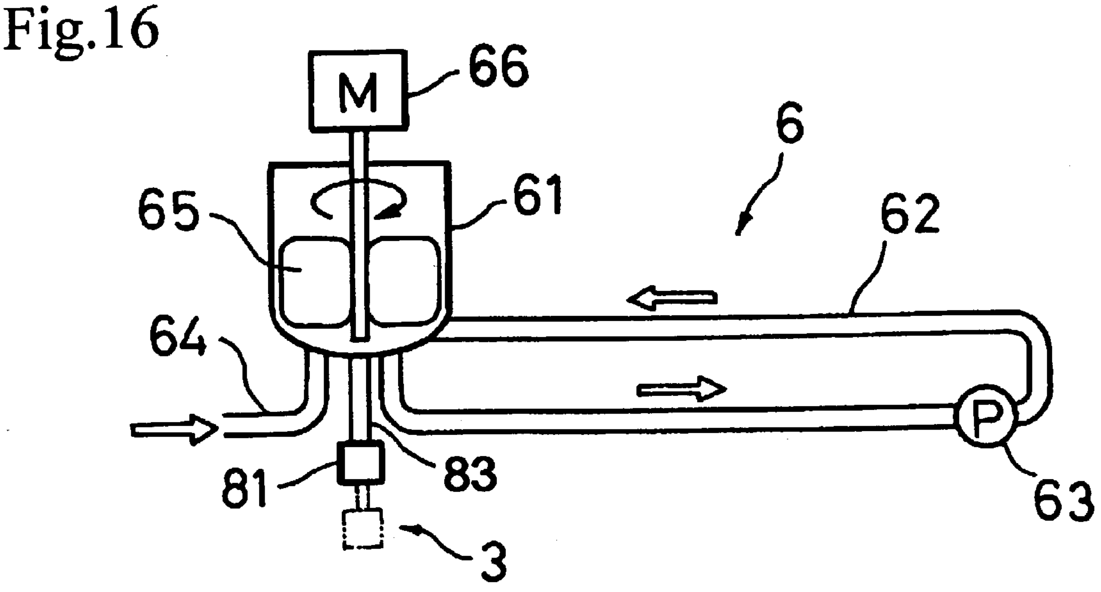
FIG. 16 shows still another example of the molten soap circulating section of the apparatus for producing soap cakes according to the present invention.

In the sixth embodiment shown in FIG. 16, the injecting section 3 is not connected to the circulating duct 62 of the circulating section 6. The heating unit and the cooling unit are not provided on the circulating duct 62, either. Instead, the injecting section 3 is connected to the storage tank 61 through a connecting pipe 83 which is connected to the storage tank 61 apart from the circulating duct 62. A cooling unit 81 is fitted to the connecting pipe 83 which connects the storage tank 61 and the injecting section 3. In other words, the cooling unit 81 is provided between the storage tank 61 and the injecting section 3. While FIG. 16 shows only one injecting section 3, a plurality of injecting sections may be connected to the storage tank 61. In that case, every pipe connecting each injecting section 3 and the storage tank 61 is provided with the cooling unit 81. In either case, the cooling temperature by the cooling unit 81 is set lower than the retained temperature of the heat retainer which keeps the storage tank 61 warm. In this way, the molten soap is cooled to a temperature lower than the retained temperature by, for example, about 0.5 to 10° C.

According to this embodiment, since the molten soap is cooled to a temperature lower than that of the circulating molten soap before it is injected into the cavity of the mold, there is an advantage that the time for cooling for solidification in the cavity is shorter than in the first embodiment similarly to the fifth embodiment. Additionally, because the circulating duct 62 is not cooled unlike in the fifth embodiment, the heating unit used in the fifth embodiment is not needed, which simplifies the structure of the apparatus.

Figure 17A:
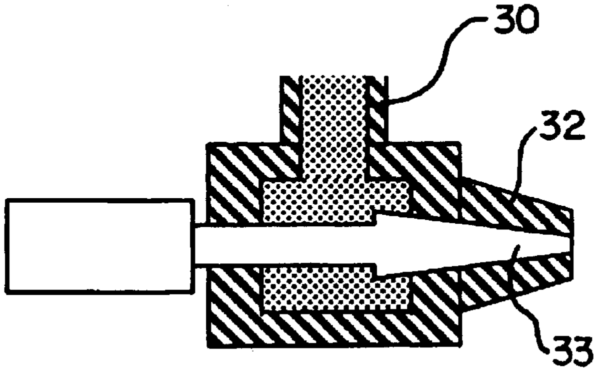
FIGS. 17(*a*) and 17(*b*) each show a plug different from that shown in FIG. 4(*b*)
Figure 17B:
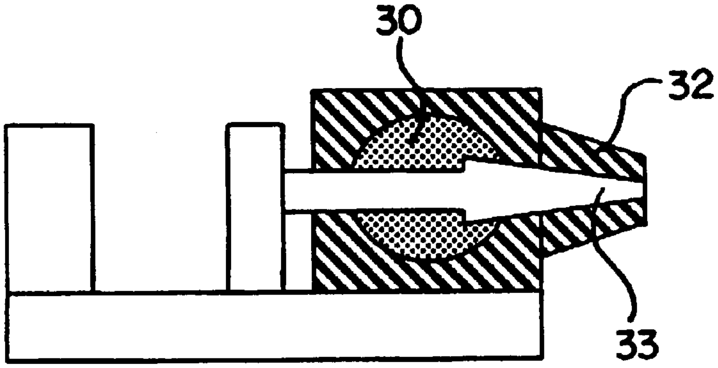

The present invention is not limited to the above-described embodiments. For example, in the foregoing embodiments the contour of the plug 33 perfectly agrees with the inner shape of the injection nozzle 32. With the plug 33 completely inserted into the nozzle 32, there is no gap left in the nozzle. It suffices, however, for the plug 33 to have at least the tip thereof shaped to the inner shape of the tip of the nozzle 32 as far as the amount of molten soap remaining in the nozzle is such that does not hinder molding. Conversely, the plug 33 may be longer than the nozzle 32 so that its rear end may stick into the feed pipe 30 when it plugs the nozzle as shown in FIGS. 17(*a*) and 17(*b*).

The shape of the injection nozzle is not limited to a truncated cone and includes other shapes, such as a truncated pyramid.

While the foregoing embodiments have been described with the respective examples in which the moving direction of the gate pin 22 and the molten soap flowing direction in the gate 21 make an angle of 0° or 90°, this angle is subject to variation within a range of from 0 to 90° taking into consideration the balance between (1) the force required to push the gate pin 22 through the gate 21 and to maintain that state and (2) the area of the gate mark made on the resulting soap cake as previously mentioned.

While in the third and fourth embodiments the molten soap feed pipe 30 is connected directly to the storage tank, it may be connected to the molten soap circulating duct as in the first and second embodiments. Conversely, in the first and second embodiments the feed pipe may be connected directly to the storage tank.

Figure 18A:
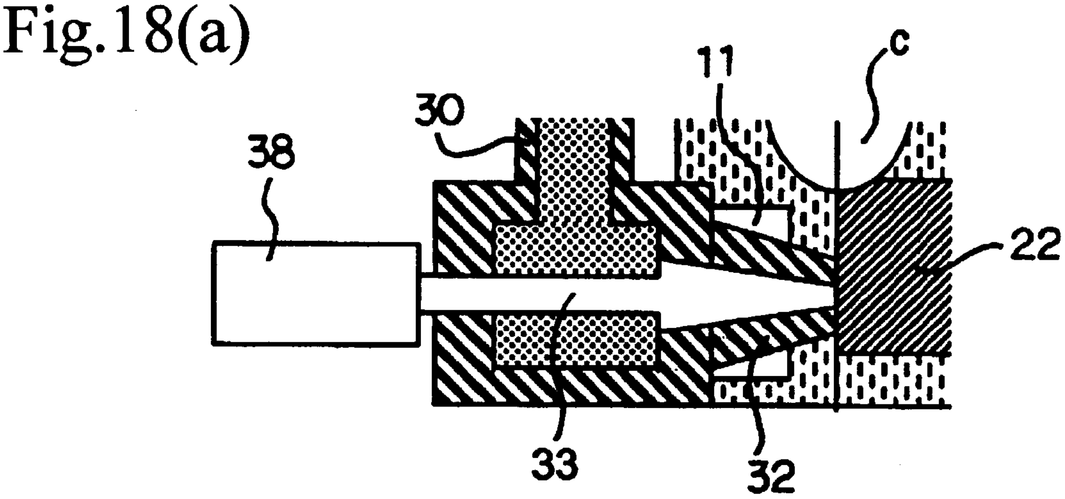
FIGS. 18(*a*) and 18(*b*) each show a combination of a nozzle and a nozzle insert port different from that shown in FIG. 4(*b*)
Figure 18B:
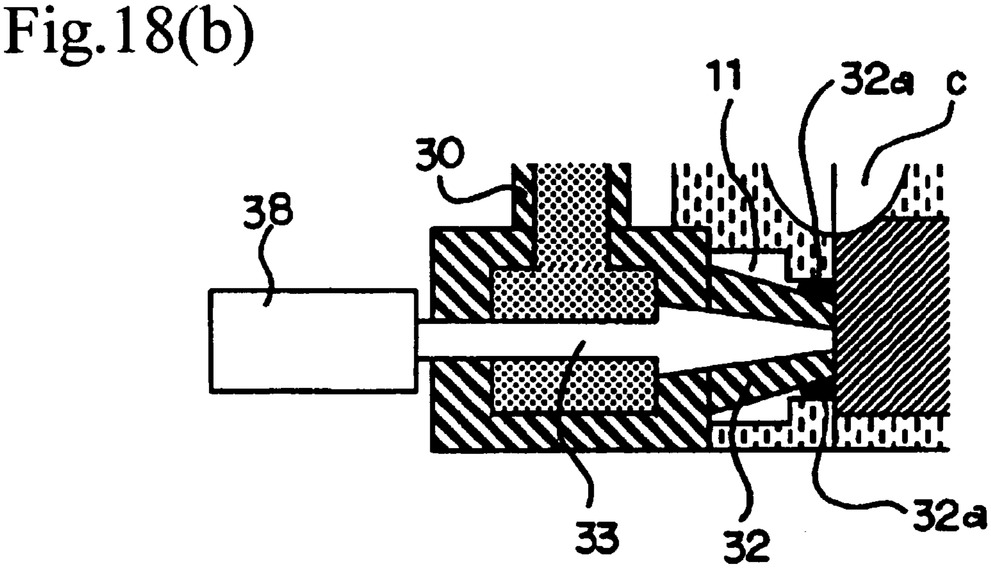

While in the foregoing embodiments the contour of the nozzle 32 perfectly agrees with the inner shape of the nozzle insert port 11, leaving no gap therebetween, it suffices for the nozzle 32 to have at least the tip thereof shaped to the deepest part of the nozzle insert port 11 as shown in FIG. 18(*a*) as far as the amount of molten soap remaining in the nozzle insert port 11 is such that does not hinder molding. Even where the tip of the nozzle 32 does not perfectly mate the deepest part of the nozzle insert port 11, an O ring 32*a* may be fitted around the tip of the nozzle 32 as shown in FIG. 18(*b*) so as to leave no gap with the deepest part of the hole 11 when the nozzle 32 is inserted.

Figure 19A:
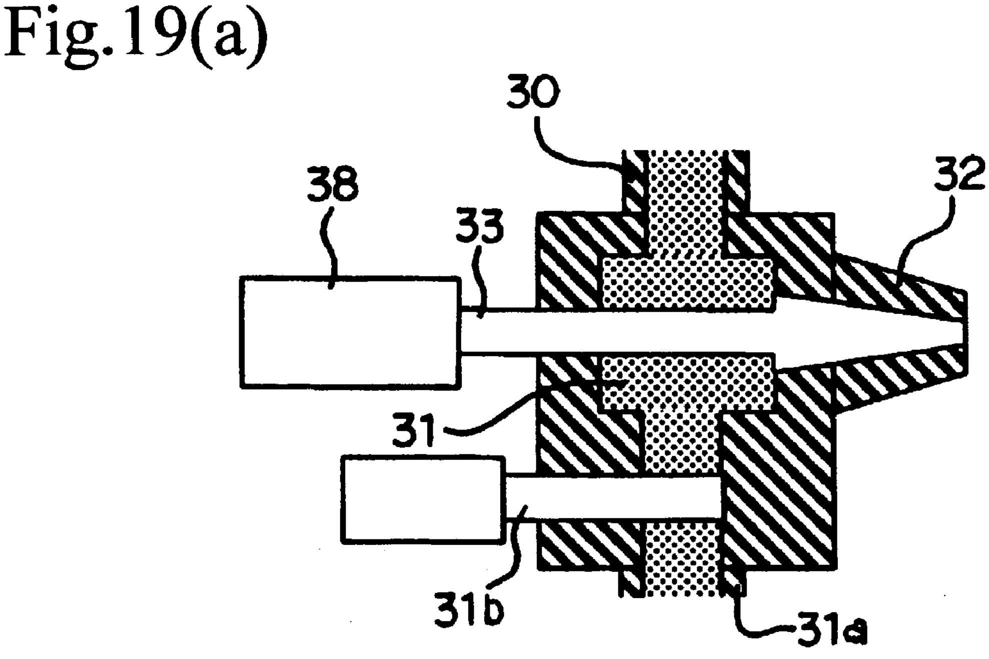
FIGS. 19(*a*) and 19(*b*) show a modified injecting section.
Figure 19B:
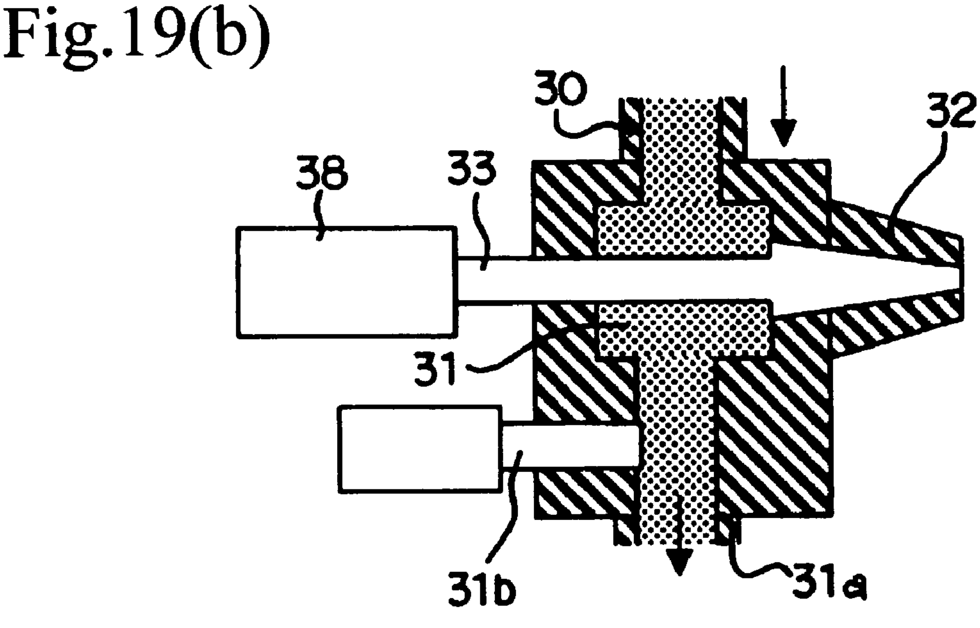

As shown in FIGS. 19(*a*) and 19(*b*), it is possible to provide a return pipe 31*a* and an open and shut valve 31*b* under the molten soap reservoir 31, which is formed at the tip of the feed pipe 30, in the first and second embodiments. The return pipe 31*a* connects the reservoir 31 and the circulating duct 62. While the apparatus is working, the valve 31*b* is closed as shown in FIG. 19(*a*). While the molding operation is suspended, the valve 31*b* is opened as shown in FIG. 19(*b*), and the piston 36 continues operating to feed molten soap through the feed pipe 30 and return the molten soap to the circulating duct 62 through the return pipe 31*a*. This design makes it possible to feed fresh molten soap to the nozzle 32 anytime when the molding operation is resumed after suspension.

Needless to say, the present invention is applicable to production of not only aerated soap cakes as specifically described above but other types of soap cakes. Moreover, the mold that can be used in the present invention includes not only the closed split mold as used in the foregoing embodiments but an open type mold.

In the foregoing embodiments the molding section 4 having the mold 40 is movable as a whole to join with or separate from the injecting section 3 having the injection nozzle 32. In place of, or in addition to, this structure, the apparatus may be designed to move the whole injecting section 3 having the injection nozzle 32 to join with or separate from the molding section 4 having the mold 40.

As described above, the present invention does not involve stagnation or remaining of molten soap in the gate of a mold or in the injection nozzle after completion of filling the mold with molten soap. Accordingly, there is no need to remove residual solidified soap from the mold, which leads to improved productivity. Since fresh molten soap is supplied for every shot, molding can be carried out smoothly, and homogeneous soap cakes can be obtained. Having no unnecessary parts, the resulting soap cakes need no trimming. The mold requires no cleaning for each shot. These advantages also contribute to high productivity.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

This application claims the priority of Japanese Patent Application Nos. 2002-82024 filed Mar. 22, 2002 and 2002-82025 filed Mar. 22, 2002, which are incorporated herein by reference.

What is claimed is:

1. A method of producing a soap cake which comprises:

moving one of a separate nozzle and a feed port of a mold to insert said nozzle into said feed port of said mold such that the nozzle moves in a first direction relative to the feed port during insertion of the nozzle;

feeding molten soap to be metered from a molten soap source to the mold having a cavity of prescribed shape, a gate leading to said cavity, and a gate pin slidably provided in said gate, said feeding being through said nozzle, said feed port, and said gate, and pushing said gate pin through said gate while maintaining the feed of said molten soap into said cavity from the molten soap source to plug said gate thereby to stop said feeding and to press the molten soap remaining in said gate into said cavity, wherein the gate pin moves in a second direction, different from the first direction during said pushing.

2. The method according to claim 1, wherein said gate is located under said cavity, and the molten soap is fed in the upward direction from the lower part of said cavity.

3. A method of producing a soap cake which comprises:

feeding molten soap from a molten soap source to a mold having a cavity of prescribed shape, a gate leading to said cavity, a gate pin slidably provided in said gate, said feeding being through said gate, and at a time when the gate is at least partially open with respect to the gate pin, removing the molten soap remaining in said gate out of said mold by suction while pushing said gate pin.

4. A method of producing a soap cake comprising:

feeding molten soap to the cavity of prescribed shape of a mold through a feed passage leading to said cavity and solidifying the molten soap, wherein said feed passage is formed of at least a gate which is formed in said mold and leads to said cavity and an injection nozzle directly connected to said gate;

plugging said gate with a gate pin to expel any molten soap remaining in said gate; and plugging said injection nozzle with a plug to expel any molten soap remaining in said injection nozzle, wherein the gate pin and the plug are separately moveable.

5. The method according to claim 4, wherein the molten soap is fed at a low rate in the initial stage of feeding such that air bubbles of sizes perceptible to the eye do not generate and remain in the resulting soap cake, at a higher rate in the intermediate stage of feeding than in the initial stage, and at a lower rate in the final stage of feeding than in the intermediate stage of feeding.

6. The method according to claim 5, wherein a feeder for delivering a set-up volume of the molten soap to said cavity is provided in the upstream of said nozzle with respect to the flowing direction of said molten soap, and the feeding rate of said molten soap is controlled by said feeder.

7. The method according to claim 4, wherein the molten soap is fed to the cavity while adjusting the opening of said feed passage and, simultaneously with the feeding, said feed passage is plugged to expel any molten soap remaining in said feed passage.

8. The method according to claim 7, wherein the opening of said feed passage is adjusted so that the molten soap is fed at a low rate in the initial stage of feeding such that air bubbles of sizes perceptible to the eye do not generate and remain in the resulting soap cake, at a higher rate in the intermediate stage of feeding than in the initial stage, and at a lower rate in the final stage of feeding than in the intermediate stage of feeding.

9. The method according to claim 4, wherein the molten soap is fed in the upward direction from the lower part of said cavity.

10. An apparatus for producing a soap cake comprising:

a mold for molding molten soap into a prescribed shape; and an injection section for feeding molten soap to said mold, wherein said mold has a molten soap feed port, said injection section has a nozzle which sticks out from part of said injection section with its diameter decreasing toward the tip thereof and a plug which has substantially the same shape as the inner shape of said nozzle and is slidably disposed in said nozzle, said nozzle is capable of being inserted into said feed port of said mold, at least one of said mold and said nozzle is movable to join with each other and separate from each other, said molten soap feed port is configured to be plugged by a pin, and the pin and the plug are separately moveable.

11. The apparatus according to claim 10, wherein a feeder for delivering a set-up volume of the molten soap to said cavity is provided in said feed pipe in the upstream of said nozzle with respect to the flowing direction of said molten soap, said feeder being capable of adjusting the feed rate so that the molten soap is fed at a low rate in the initial stage of feeding such that air bubbles of sizes perceptible to the eye do not generate and remain in the resulting soap cake, at a higher rate in the intermediate stage of feeding than in the initial stage, and at a lower rate in the final stage of feeding than in the intermediate stage of feeding.

12. The apparatus according to claim 10, wherein said feed port is positioned under the cavity of said mold, and the molten soap is fed in the upward direction from the lower part of said cavity.

13. The apparatus according to claim 10, wherein a feeder for delivering a set-up volume of the molten soap is provided in said feed pipe in the upstream of said nozzle with respect to the flowing direction of said molten soap, and said feeder is equipped with a switchover valve for connecting said feeder alternatively to the upstream or the downstream of said feed pipe.

14. The apparatus according to claim 10, wherein said feed pipe is equipped with a pressure pump which is adapted to feed the molten soap to the cavity of said mold under pressure.

* * * * *